United States Patent [19]

Hayes

[11] Patent Number: 5,149,723
[45] Date of Patent: Sep. 22, 1992

[54] STABILIZED POLYACETAL COMPOSITIONS CONTAINING A MIXTURE OF HALS HAVING TERTIARY FUNCTIONALITY

[75] Inventor: Richard A. Hayes, Parkersburg, W. Va.

[73] Assignee: E. I. Du Pont de Nemours and Company, Wilmington, Del.

[21] Appl. No.: 673,352

[22] Filed: Mar. 22, 1991

[51] Int. Cl.$^5$ ................................................ C08K 5/34
[52] U.S. Cl. ........................................ 524/99; 524/97; 524/100; 524/102; 524/90; 524/91
[58] Field of Search ............. 524/102, 100, 97, 98, 91

[56] References Cited

U.S. PATENT DOCUMENTS

| | | | |
|---|---|---|---|
| 4,086,204 | 4/1978 | Cassandrini et al. | 260/45.8 NT |
| 4,233,412 | 11/1980 | Rody et al. | 525/167 |
| 4,331,586 | 5/1982 | Hardy | 525/186 |
| 4,446,263 | 5/1984 | Bryant | 524/100 |
| 4,717,745 | 1/1988 | Ishii | 524/91 |
| 4,730,015 | 3/1988 | Ikenaga et al. | 524/91 |
| 4,863,981 | 9/1989 | Gugumus | 524/97 |
| 4,929,652 | 5/1990 | Gugumus | 524/95 |

FOREIGN PATENT DOCUMENTS

| | | |
|---|---|---|
| 0151042 | 8/1985 | European Pat. Off. . |
| 0351235 | 1/1990 | European Pat. Off. . |
| 0388809 | 9/1990 | European Pat. Off. . |
| 60-195155 | 10/1985 | Japan . |
| 63-193950 | 8/1988 | Japan . |

*Primary Examiner*—Paul R. Michl
*Assistant Examiner*—Tae H. Yoon

[57] ABSTRACT

This invention relates to polyacetal compositions that are stabilized against ultraviolet light and heat degradation due to the inclusion therein of a mixed hindered amine light stabilizer (HALS) system, wherein each HALS of the system contains a hindered amine that is of tertiary functionality.

14 Claims, No Drawings

STABILIZED POLYACETAL COMPOSITIONS CONTAINING A MIXTURE OF HALS HAVING TERTIARY FUNCTIONALITY

BACKGROUND OF THE INVENTION

1. Technical Field

This invention relates to polyacetal compositions which contain a particular mixed hindered amine light stabilizer ("HALS") system.

Polyacetal (also commonly referred to as polyoxymethylene) compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyacetals of relatively high molecular weight, i.e., 10,000 to 100,000 are useful in preparing semi-finished and finished articles by any of the techniques commonly used with thermoplastic materials, e.g., compression molding, injection molding, extrusion, blow molding, rotational molding, melt spinning, stamping, thermoforming and the like. Finished articles made from such compositions possess desirable physical properties, including high stiffness, strength, low coefficient of friction, and good solvent resistance.

In some applications, polyacetal compositions are exposed to UV light for long periods of time. It desired that such polyacetal compositions remain relatively stable upon exposure to UV light for such extended periods of time. The stability of a polyacetal composition upon exposure to UV light can be measured by the weight loss and physical property loss it experiences during the exposure to UV light.

To impart or improve UV light stability to a polyacetal composition, a HALS may be added thereto. However, it is not uncommon that the addition of a HALS can adversely affect other properties of the polyacetal composition, particularly its melt processing stability (measured by a thermally evolved formaldehyde test) and/or its retention of physical properties (such as tensile strength and elongation) upon exposure to the heat and air.

It has been found, in the present invention, that the inclusion of a particular mixed HALS system into a polyacetal composition results in a polyacetal composition having good stability upon exposure to UV light, as measured by weight loss upon exposure to UV light. Further, it has been found that the inclusion of this particular mixed HALS system into polyacetal compositions does not significantly adversely affect the other properties of the polyacetal composition (in particular, its melt processing stability and its ability to retain physical properties, elongation and tensile strength, when exposed to heat and air).

The particular mixed HALS system used in the compositions of the present invention is made of two types of HALS, referred to hereinafter as "Type I HALS" and "Type II HALS". Type I HALS are those HALS not having an s-triazine ring but further having a piperidine ring or an oxo-piperazinyl ring, provided that each such ring contains a hindered amine at the $N^4$ position in the ring. The hindered amine must be of tertiary functionality. Type II HALS are those HALS having an s-triazine ring and further having a piperidine ring or an oxo-piperazinyl ring, provided that each such ring contains a hindered amine at the $N^4$ position in the ring. As with Type I HALS, the hindered amine must be of tertiary functionality.

The compositions of the present invention are useful wherever it is desired to use a polyacetal composition having enhanced thermal and UV stability both during and after melt processing. Shaped or molded articles prepared from the compositions of the present invention can be used in, for example, irrigation or automotive applications.

2. Background Art

U.S. Pat. No. 4,863,981 discloses a stabilizer mixture containing two high molecular weight polyalkylpiperidines. The stabilizer mixture is disclosed as being useful in a wide variety of polymers. There is no teaching that HALS such as those of the present invention, wherein the hindered amine in the HALS is of tertiary functionality, are particularly beneficial in polyacetal compositions.

U.S. Pat. No. 4,446,263 discloses an acetal copolymer stabilizer mixture of 1,6-hexamethylene bis(3,5-di-tert-butyl)-4-hydroxyhydrocinnamate (serving as an antioxidant), 2,4,6-triamino-sym-triazine (serving as an acid scavenger), bis(1,2,2,6,6-pentamethyl-4-piperidinyl) (3,5-bis(1,1-dimethylethyl-4-hydroxyphenol)methyl)-)butyl propanedioate (serving as a free radical scavenger), and 2-hydroxy-4-n-octoxy-benzophenone (serving as a UV absorber).

U.S. Pat. No. 4,717,745 discloses a polyacetal composition which incorporates a certain hindered phenolic-type compound and, optionally, a HALS component.

EPO 351 235 discloses a polyacetal composition comprising a weathering (light) stabilizer component and an acrylic oligomer of a polyester type component.

Japanese Patent Publication 60-195155 discloses a polyoxymethylene composition with improved weatherability comprising polyoxymethylene, a benzotriazole UV absorber, and a HALS.

Japanese Patent Publication 63-193950 discloses a polyacetal resin containing a UV absorber and a HALS.

None of the references given above teach of the advantageous results that are achieved when the particular mixed HALS system of the present invention is incorporated into a polyacetal composition.

SUMMARY OF THE INVENTION

The present invention relates to polyacetal compositions consisting essentially of (a) 95.00 to 99.90 weight percent of a polyacetal polymer, (b) 0.05 to 2.50 weight percent of at least one Type I HALS selected from HALS (b)(1) and HALS (b)(2) as follows:

HALS (b) (1)

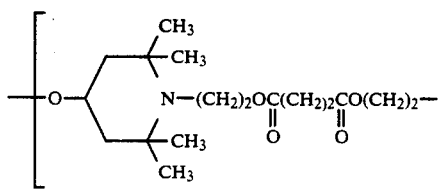

-continued

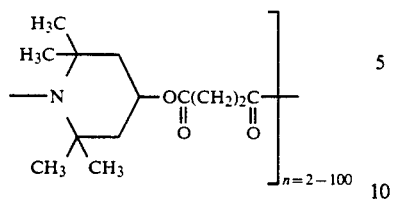

HALS (b)-(2)

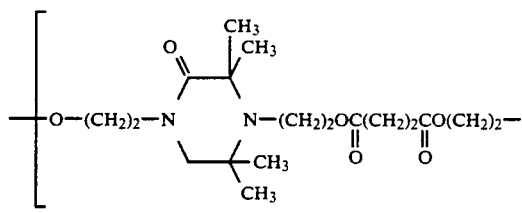

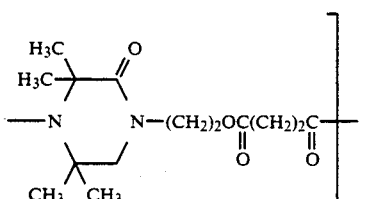

and (c) 0.05 to 2.50 weight percent of at least one Type II HALS selected from the group consisting of HALS (c)(1), HALS (c)(2), and HALS (c)(3) as follows:

HALS (c) (1)

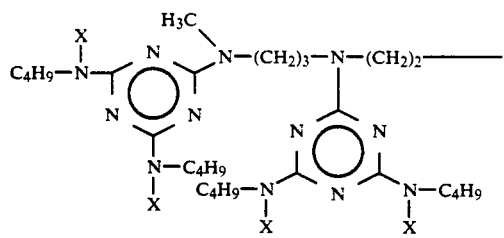

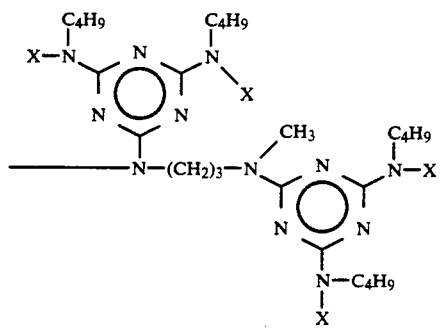

HALS (c) (2)

-continued

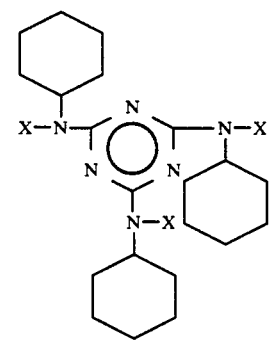

HALS (c) (3)

and where in each of HALS (c)(1), HALS (c)(2), and HALS (c)(3), X is either

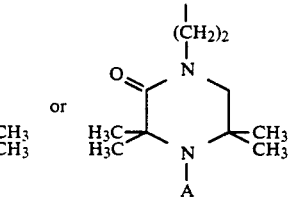

and A is $C_1-C_6$ alkyl, most preferably methyl.

The compositions of the present invention possesses good UV light stability and do not suffer a significant loss of certain other properties, particularly melt processing stability and physical properties such as elongation and tensile strength, inherent in a polyacetal composition.

DETAILED DESCRIPTION OF THE INVENTION

The Composition

This invention relates to certain polyacetal compositions containing a particular mixed HALS system. The particular mixed HALS system contains (1) at least one Type I HALS and (2) at least one Type II HALS. As stated above, Type I HALS are those HALS not having an s-triazine group but further having a piperidine or an oxo-piperazinyl ring, provided that each such ring has a hindered amine, at the $N^4$ position in the ring, that is alkylated with a $C_1-C_6$ group. Type II HALS are those HALS having an s-triazine ring and further having a piperidine or an oxo-piperazinyl ring, wherein each such ring has a hindered amine (i.e., the $N^4$ atom in the ring) that is alkylated with a $C_1-C_6$ group.

In the preferred embodiment, this invention relates to compositions consisting essentially of (a) 95.00 to 99 90 weight percent of a polyacetal polymer, (b) 0.05 to 2 50 weight percent of at least one Type I HALS selected from HALS (b)(0) and HALS (b)(2) as follows:

HALS (b) (1)

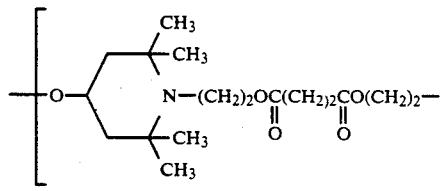

HALS (b)-(2)

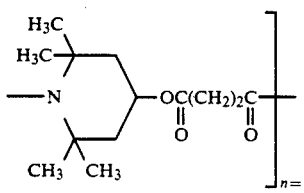

and (c) 0.05 to 2.50 weight percent of at least one Type II HALS selected from the group consisting of HALS (c)(1), HALS (c)(2), and HALS (c)(3) as follows:

HALS (c) (1)

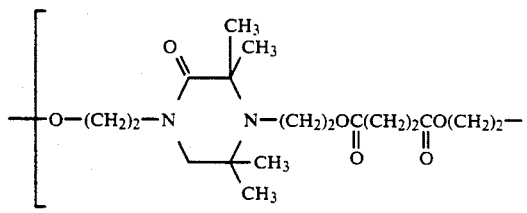

HALS (c) (2)

HALS (c) (3)

and wherein each of HALS (c)(1), HALS (c)(2), and HALS (c)(3), X is either

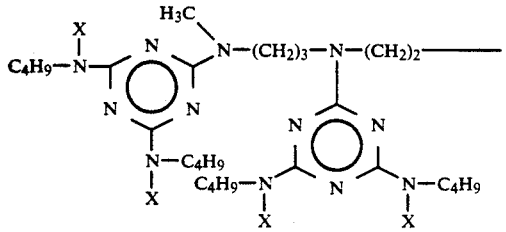

and A is $C_1$–$C_6$ alkyl, most preferably methyl.

Preferably, the compositions of the present invention consists essentially of 96.00 to 99.90 weight percent of the component (a) polyacetal, 0.05 to 2.00 weight percent of the component (b) Type I HALS, and 0 05 to 2.00 weight percent the component (c) Type II HALS. More preferably, this composition consists essentially of 97.00 to 99.90 weight percent of the component (a) polyacetal, 0.05 to 1.50 weight percent of the component (b) Type I HALS, and 0.05 to 1.50 weight percent of the component (c) Type II HALS. All the above weight percents are based on the total of components (a), (b), and (c) only.

Component (a): Polyacetal

The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the thermal groups of which copolymers can be hydroxyl terminated or can be end-capped by esterification or etherification.

The polyacetals used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness. Preferred polyacetal homopolymers include those whose terminal hydroxyl groups have been end-capped by a chemical reaction to form ester or ether groups, preferably acetate or methoxy groups, respectively.

Component (b): Type I HALS

Component (b) is a Type I HALS, as described above. More specifically, Type I component (b) HALS do not contain an s-triazine ring. The Type I component (b) HALS does, however, contain at least one piperidine ring or oxo-piperazinyl ring. Both the piperidine ring and the oxo-piperazinyl ring contain a hindered amine at the $N^4$ position in the ring that is alkylated with a $C_1$-$C_6$ group, preferably with a $C_1$-$C_3$ group, and most preferably with a methyl group, such that it is of tertiary amine functionality. Type I component (b) HALS are commercially available or can be prepared by readily available techniques, such as described in U.S. Pat. No. 4,233,412.

The preferred Type I HALS component (b) useful in the compositions of the present invention is selected from HALS (b)(1) and HALS (b)(2), as described above. The more preferred embodiment of HALS (b)(1) and HALS (b)(2) is where A is a $C_1$-$C_3$ group and most preferably, it is where A is a methyl group. Preferably, n ranges from 2 to 50, most preferably from 2 to 20.

Component (c): Type II HALS

Component (c) is a Type II HALS, as described above. More specifically, Type II component (c) HALS contain an s-triazine ring. The Type II component (c) HALS further contains at least one piperidine ring or oxo-piperazinyl ring. Both the piperidine ring and the oxy-piperazinyl ring contain a hindered amine at the $N^4$ position in the ring that is alkylated with a $C_1$-$C_6$ group, preferably with a $C_1$-$C_3$ group, and most preferably with a methyl group, such that it is of tertiary amine functionality. Type II component (c) HALS are commercially available or can be prepared by readily available techniques, such as described in U.S. Pat. No. 4,086,204 or U.S. Pat. No. 4,331,586.

The preferred Type II HALS component (c) useful in the compositions of the present invention is selected from HALS (c)(1), HALS (c)(2), and HALS (c)(3), as described above. The more preferred embodiment of HALS (c)(1), HALS (c)(2), and HALS (c)(3) is where A is a $C_1$-$C_3$ group and most preferably, it is where A is a methyl group. For HALS (c)(2), n preferably ranges from 2 to 50, most preferably from 2 to 20. HALS (c)(1), wherein X is a piperidine structure, and HALS (c)(3), wherein X is an oxo-piperazinyl structure, are the more preferred embodiments of component (c) Type II HALS.

Other Additives

It should be understood that the compositions of the present invention can include, in addition to the components (a), (b), and (c), other ingredients, modifiers and additives as are generally used in polyacetal molding resins, including thermal stabilizers, antioxidants, pigments, colorants, toughening agents, reinforcing agents, UV absorbers, nucleating agents, lubricants, glass fibers, and fillers. It should also be understood that some pigments and colorants can, themselves, adversely affect the stability of polyacetal compositions.

Thermal stabilizers of particular interest include polyamide stabilizers, especially nylon terpolymers, hydroxy-containing polymers such as those described in U.S. Pat. Nos. 4,766,168 and 4,814,397, and non-meltable nitrogen-containing or hydroxy-containing polymers, such as those described in European patent publication 0388809. Generally, the total amount of thermal stabilizer added to the polyacetal composition is between 0.05 to 5.00, preferably 0.05 to 2.50, and most preferably, 0.05 to 1.50 weight percent, said weight percents being based upon the weight of the polyacetal and the thermal stabilizers only.

It has also been found that the inclusion of a mixed antioxidant system into the compositions of the present invention results in compositions in which melt processing stability and discoloration during melt processing is synergistically improved. The mixed antioxidant system consists of N,N-hexamethylene bis(3,5-di-tert-butyl-4-hydroxy-hydrocinnamide), which is a hindered phenolic antioxidant, and at least one other hindered phenol type antioxidant, such as triethyleneglycol bis(3-(3'-tert-butyl-4'-hydroxy-5'-methylphenyl)-proprionate or tetrakis (methylene (3,5-di-tert-butyl-4-hydroxy-hydrocinnamate)) methane. Other hindered phenol type antioxidants are known in the art. Generally, the weight percent of total antioxidant added to the polyacetal composition is less than 2 00, preferably less than 1 00, and most preferably less than 0.50 weight percent, said weight percent being based upon the weight of the polyacetal, thermal stabilizer (if any), and the antioxidants only.

Further, a UV absorber, in combination with the mixed HALS system described herein, has been found to impart a UV resistance to the polyacetal composition that is superior to the UV resistance of a polyacetal composition containing an equivalent amount of either the UV absorber or the mixed HALS system described herein. As such, for even further improved UV stability, it may be advantageous to incorporate into the compositions of the present invention at least one UV absorber. UV absorbers are known and include benzotriazoles, such as 2-(3',5'-bis(1-methyl-1-phenylethyl)-2'-hydroxyphenol)benzotriazole; benzophenones, such as 2-hydroxy-4-n-octoxybenzophenone; oxanilides (oxalic acid diamines), such as 2-ethoxy-5-tert-butyl-2'-ethyloxanilide and its mixture with 2-ethoxy-2'-ethyl-5,4'-di-tert-butyloxanilide; cyanoacrylates and mixtures of the above types of UV absorbers. Generally, the total weight percent of UV absorber added to the polyacetal composition is between 0.05 to 5.00, preferably between 0.05 to 4.00, and most preferably between 0.05 to 1.00 weight percent, said weight percent being based upon the weight of the polyacetal, thermal stabilizers (if any), antioxidants, and UV absorbers only.

Preparation of the Compositions

The compositions of the present invention can be prepared by mixing the mixed HALS system of the present invention with the polyacetal polymer at a temperature above the melting point of the polyacetal polymer using any intensive mixing device conventionally used in preparing thermoplastic polyacetal compositions, such as rubber mills, internal mixers such as "Banbury" and "Brabender" mixers, single or multiblade internal mixers with a cavity heated externally or by friction, "ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing, such as valves, gates or screws designed for this purpose. Extruders are preferred. Of course, such mixing should be conducted at a temperature below which significant degradation of the polyacetal component of the composition will occur. Generally, polyacetal compositions are melt processed between 170° C. to 280° C., preferably between 185° C. to 240° C., and most preferably 195° C to 225° C.

Shaped articles can be made from the compositions of the present invention using any of several common methods, including compression molding, injection molding, extrusion, blow molding, rotational molding, melt spinning, and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170°-270° C., preferably 185°-240° C., most preferably 200°-230° C. When injection molding the compositions of the present invention, it is preferred that the mold be as cold as possible consistent with the intricacy of the shape being produced. Generally, the mold temperature will be 10°-120° C., preferably 10°-100 C., and most preferably about 50°-90° C.

EXAMPLES

The following are the results of tests conducted to determine the effectiveness of the particular mixed HALS system of the present invention on polyacetal compositions. Also provided are test results on control compositions. All temperatures are in degrees Celsius unless otherwise specified Measurements have been rounded where appropriate.

Unless specified otherwise, the polyacetal polymer used in the examples below was an acetate end-capped homopolymer having a number average molecular weight of about 40,000.

The HALS used in the examples below were as follows:

Type I and Type II HALS

"HALS A" was a Type I component (b) HALS. Specifically, it was HALS (b)(1), given above, wherein n=9-14. HALS A is sold commercially as Tinuvin ® 622 (Ciba-Geigy).

"HALS B" was a Type II component (c) HALS. Specifically, it was HALS (c)(1), given above, wherein X was

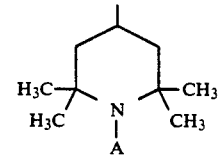

and "A" was a methyl group. HALS B is sold commercially as Chimassorb 119 (Ciba-Geigy).

"HALS C" was a Type II component (c) HALS. Specifically, it was identical to HALS (c)(3), given above, wherein X was

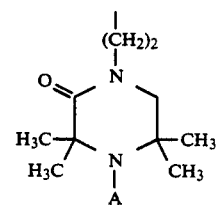

and "A" was a methyl group.

Control HALS

"HALS Control 1" was poly-((6-((4-piperidone)-imino)-s-triazine-2,4-diyl)(2-(2,2,6,6-tetramethyl-piperidinyl)-iminohexamethylene-(4-(2,2,6,6-tetramethylpiperidinyl)imino)) having the following structure:

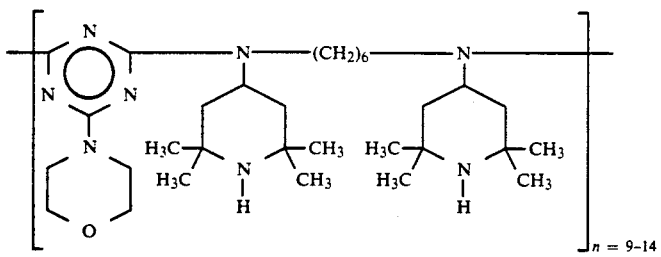

HALS Control 1 was neither a Type I nor a Type II HALS because the hindered amine at the $N^4$ position in the piperidine ring was of secondary functionality. HALS Control 1 is sold commercially under the trade name Cyasorb UV-3346 (American Cyanamid).

Preparation of Composition for Testing

The samples tested herein were each prepared as follows: the components for each composition were mixed together and melt compounded on a 2.5-inch Sterling single screw extruder with barrel temperature settings of 150° C. to 200° C., die temperature settings of 210° C., and screw speeds of 75 rpms. The temperature of the melt as it exited the die ranged from 220° C. to 230° C.

Testing Procedures

The melt processing stability of all the compositions was determined using a thermally evolved formaldehyde ("TEF") test procedure. In the TEF test, a weighed sample of the polyacetal composition to be tested was placed in a tube and the tube was fitted with a cap for introduction of nitrogen to the test sample for removal of any evolved gases from the apparatus while maintaining the sample in an oxygen free environment. The tube that contained the sample was heated at 259° C. in a silicone oil bath. The nitrogen and any evolved gases transported thereby were bubbled through 75 ml of a 40 g/liter sodium sulfite in water solution. Any evolved formaldehyde reacts with the sodium sulfite to liberate sodium hydroxide. The sodium hydroxide was continuously neutralized with standard 0.1 N HCl. The results were obtained as a chart of ml of titer versus test time. The percent evolved formaldehyde was calculated by the formula $$(V)(N)\frac{0.03 \times 100}{SW}$$

where
V = the volume of titer in milliliters,
N = the normality of the titer, and
SW = the sample weight in grams.

The factor "0.03" is the milliequivalent weight of formaldehyde in g/milliequivalent. TEF results are conveniently reported after fifteen minutes and after thirty minutes heating. The results are reported in the tables below under "Wt.% $CH_2O$@259° C."

Retention of physical properties for each composition was determined using air oven aging studies. For the air oven aging studies, the melt compounded samples were molded into ⅛-inch thick tensile bars. The tensile bars for each composition were preweighed and placed in a circulating air oven at 130° C. for the times noted in the Tables, below. Oven location effects were averaged by distributing bars of a sample throughout the oven. At the end of the specified time period, the tensile bars were removed from the oven, weighed, and tested for tensile strength and elongation according to ASTM Method D-638 (0.2 in/min crosshead speed). The percent weight loss was calculated as: (1 − ((weight after aging)/(weight before aging)) × 100. The results reported below represent the average of five tensile bars.

The UV light stability of each composition was determined through exposure to UV light, as described below. The compositions were tested to determine weight loss after exposure to UV light. Samples for testing were molded into plaques having dimensions of 5 cm × 8.1 cm × 4 mm. The molded plaques weighed between 21 to 23 grams and the surface finish of said plaques was a high gloss surface. The high gloss side of the plaque was exposed to a UV light source at a prescribed amount (i.e., 300, 600, 900, 1250, 1500, or 2000 kJ/$m^2$, as specified below). All samples were subjected to UV light exposure under the same conditions. Samples were weighed prior to testing. The samples were all subjected to accelerated UV exposure in an Atlas Ci65 Xenon Arc Weatherometer, operated as per SAE J1885 (Automotive Interior Conditions), with a quartz inner filter and a borosilicate outer filter. Pertinent details of the SAE J1885 method appear directly below as follows:

|  | Light Cycle | Dark Cycle |
| --- | --- | --- |
| Irradiance (Watts/$m^2$) | 0.55 | — |
| Black Panel Temp. (°C.) | 89.0 | 38.0 |
| Relative Humidity (%) | 50.0 | 100.0 |
| Cycle Time (hours) | 3.8 | 1.0 |

Weight loss after UV light exposure at the prescribed amount detailed below, was determined by weighing the sample after exposure to UV light at the prescribed amount and then calculating percent weight loss by the following formula: ([(unexposed sample weight) − (exposed sample weight)]/[unexposed sample weight]) × 100%. Weight loss is a standard test for studying polyacetal UV light degradation.

EXAMPLES 1–4

The components for Examples 1–4 and Control Examples C1–C2 are listed in TABLE IA, below. Each composition in TABLE IA additionally contained the following mixed thermal stabilizer system: 0.75 weight percent of an ethylene-vinyl alcohol copolymer polymer (described in U.S. Pat. No. 4,766,168) and 0.25 weight percent of a 33/23/43 terpolymer of nylon 66, nylon 6/10, and nylon 6, respectively. Each composition in TABLE IA also contained 0.10 weight percent of the phenolic antioxidant triethylene glycol bis(3-(3'-tert-butyl-4'-hydroxy-5'-methylphenyl) proprionate, 0.05 weight percent of the phenolic antioxidant N,N'-hexamethylene bis(3,5-di-tert-butyl-4-hydroxyhydrocinnamide), and 0.50 weight percent of a polyethylene glycol lubricant having a weight average molecular weight of 8,000. All weight percents provided in this paragraph and TABLE IA are based upon the weight of the total composition.

TABLE IA

| Example Number | Polyacetal (Wt. %) | HALS (Wt. %) |
|---|---|---|
| C1 | 98.35 | — |
| C2 | 97.75 | 0.30 A |
|  |  | 0.30 Control 1 |
| 1 | 97.75 | 0.30 A |
|  |  | 0.30 B |
| 2 | 97.75 | 0.30 A |
|  |  | 0.30 C |
| 3 | 97.75 | 0.50 A |
|  |  | 0.10 B |
| 4 | 97.75 | 0.50 A |
|  |  | 0.10 C |

TABLE IB provides the results of the TEF test and air oven aging tests for the compositions of TABLE IA. The compositions of Examples 1-4 each evolved less gaseous formaldehyde, after thirty minutes of testing, than did the composition of Example C1 (which contained no HALS) and the composition of Example C2 (which contained a mixed HALS system wherein one HALS had a hindered amine of secondary functionality). Further, Example C2 showed that the amount of TEF evolved by a polyacetal composition identical to that of Example C1 was actually increased when there was incorporated therein a mixed HALS system that contained a HALS having a hindered amine of secondary functionality (Example C2).

Air over aging results, reported in TABLE IB, showed that the physical properties of the polyacetal composition of Example C1 were reduced less when the mixed HALS system of the present invention was incorporated therein (Examples 1-4) than when a mixed HALS system containing a HALS with a hindered amine having secondary functionality was incorporated therein (Example C2).

In TABLE IC, results are reported for the weight loss experienced after UV light exposure by the polyacetal compositions of TABLE IA. The compositions of Examples 1-4, which each had the mixed HALS system of the present invention, had better UV stability than did the composition of Example C2, which had incorporated therein a HALS having a hindered amine with secondary functionality.

TABLE IC

| Example Number | % WT. LOSS AFTER UV EXPOSURE | | | | | |
|---|---|---|---|---|---|---|
|  | 300 kJ/m$^2$ | 600 kJ/m$^2$ | 900 kJ/m$^2$ | 1250 kJ/m$^2$ | 1500 kJ/m$^2$ | 2000 kJ/m$^2$ |
| C1 | 1.38 | 5.32 | 9.85 | 10.35 | 14.74 | 23.63 |
| C2 | 0.46 | 1.11 | 4.13 | 5.90 | 7.78 | 9.78 |
| 1 | 0.31 | 0.97 | 2.59 | 3.75 | 5.02 | 7.46 |
| 2 | 0.09 | 0.48 | 1.73 | 2.71 | 3.84 | 6.43 |
| 3 | 0.21 | 0.86 | 2.89 | 3.23 | 4.48 | 6.29 |
| 4 | 0.19 | 0.62 | 1.94 | 2.99 | 4.11 | 7.67 |

EXAMPLES 5-11

The components for Examples 5-11 and Control Examples C3-C4 are listed in Table IIA, below. Each composition in Table IIA additionally contained a hydroxybenzotriazole-type of absorber, which was 2-(2H-benzotriazol-2-yl)-4,6-bis-(1-methyl-1-phenylethyl) phenol.

The compositions of Examples C3-C4 and 5-9 each additionally contained the same mixed thermal stabilizer system, in the same weight percent, and the same phenolic antioxidants, in the same weight percent, as did the compositions of Table IA. The compositions of Examples C3-C4 and 5-9 also contained 0.50 weight percent of a polyethylene glycol lubricant having a weight average molecular weight of 8000.

The composition of Example 10 additionally contained 1.00 weight percent of a 33/23/43 terpolymer of nylon 66, nylon 6/10, and nylon 6, respectively, which served as a thermal stabilizer, and 0.10 weight percent of phenolic antioxidant 2,2'-methylene bis (4-methyl-5-tert-butylphenol). The composition of Example 11 additionally contained the following thermal stabilizer system: 0.50 weight percent of an ethylene-vinyl alcohol copolymer (described in U.S. Pat. No. 4,766,168), 0.15 weight percent of the nylon terpolymer described above, and 0.15 weight percent of microcrystalline cellulose.

The composition of Example 11 further contained the following phenolic antioxidants: 0.10 weight percent tetrakis(methylene [3,5-di-tert-butyl-4-hydroxyhydrocinnamate]) methane and 0.05 weight percent N,N'-hexamethylene bis (3,5-di-tert-butyl-4-hydroxyhydrocinnamide). The composition of Example 11 also contained 0.30 weight percent of N,N'-distearoylethylene diamine.

All the above weight percents given in TABLE IIA are based upon total composition weight.

TABLE IIA

| Example Number | Polyacetal (Wt. %) | HALS (Wt. %) | UV Absorber (Wt. %) |
|---|---|---|---|
| C3 | 97.1 | 0.30 A | 0.60 |
|  |  | 0.30 Control 1 |  |
| 5 | 97.15 | 0.30 A | 0.60 |
|  |  | 0.30 B |  |
| 6 | 97.15 | 0.30 A | 0.60 |

TABLE IB

| Example Number | Wt. % CH$_2$O @ 259° C. | | Air Oven Aging @ 130° C. | | | | | | |
|---|---|---|---|---|---|---|---|---|---|
|  | 15 min | 30 min | 0 Days | | 20.5 ± 0.5 Days | | | 40 ± 1 Days | |
|  |  |  | % E | TS | % Wt. Loss | % E | TS | % Wt. Loss | % E | TS |
| C1 | 0.06 | 0.51 | 40 | 9.6 | 0.22 | 30 | 10.6 | 0.38 | 20 | 10.6 |
| C2 | 0.20 | 0.92 | 28 | 9.8 | 2.15 | 19 | 10.2 | 4.25 | 6 | 8.2 |
| 1 | 0.06 | 0.45 | 39 | 9.6 | 0.44 | 29 | 10.5 | 1.25 | 5 | 8.8 |
| 2 | 0.08 | 0.49 | 33 | 9.6 | 0.52 | 22 | 10.6 | 0.84 | 21 | 10.4 |
| 3 | 0.06 | 0.39 | 38 | 9.7 | 0.48 | 27 | 10.7 | 1.16 | 9 | 9.8 |
| 4 | 0.03 | 0.33 | 35 | 9.6 | 0.51 | 23 | 10.5 | 0.81 | 23 | 10.6 |

TABLE IIA-continued

| Example Number | Polyacetal (Wt. %) | HALS (Wt. %) | UV Absorber (Wt. %) |
|---|---|---|---|
| C4 | 97.15 | 0.30 C<br>0.50 A<br>0.50 Control 1 | 0.60 |
| 7 | 97.15 | 0.50 A<br>0.10 B | 0.60 |
| 8 | 97.15 | 0.50 A<br>0.10 C | 0.60 |
| 9 | 97.05 | 0.60 A<br>0.10 C | 0.60 |
| 10 | 97.70 | 0.30 A<br>0.30 B | 0.60 |
| 11 | 97.55 | 0.30 A<br>0.30 B | 0.60 |

Air oven aging results and TEF test results for the compositions of TABLE IIA are reported in TABLE IIB. The amount of TEF evolved after thirty minutes of testing was least with the compositions of the present invention (i.e., Examples 5-11).

In TABLE IIC, results are reported for the weight loss experienced after UV light exposure by the polyacetal compositions of TABLE IIA. The compositions of the present invention (i.e., Examples 5-9) experienced less weight loss after forty days of testing than did the control compositions.

TABLE IIB

| Example Number | Wt. % CH$_2$O @ 259° C. | | Air Oven Aging @ 130° C. | | | | | |
|---|---|---|---|---|---|---|---|---|
| | 15 min | 30 min | 0 Days | | 20.5 ± 0.5 Days | | 40 ± 1 Days | |
| | | | % E | TS | % Wt. Loss | % E | TS | % Wt. Loss | % E | TS |
| C3 | 0.36 | 1.26 | 31 | 9.7 | 2.16 | 18 | 9.9 | 4.84 | 3 | 4.8 |
| 5 | 0.08 | 0.50 | 50 | 9.2 | 0.59 | 32 | 10.1 | 1.42 | 3 | 7.2 |
| 6 | 0.10 | 0.53 | 30 | 9.6 | 0.62 | 13 | 10.4 | 1.02 | 8 | 9.7 |
| C4 | 0.14 | 0.75 | 30 | 9.6 | 1.94 | 20 | 10.1 | 3.63 | 13 | 9.1 |
| 7 | 0.05 | 0.46 | 45 | 9.4 | 0.63 | 25 | 10.2 | 1.46 | 6 | 8.8 |
| 8 | 0.08 | 0.52 | 37 | 9.5 | 0.60 | 23 | 10.5 | 0.97 | 18 | 10.4 |
| 9 | 0.05 | 0.42 | 37 | 9.6 | 0.53 | 27 | 10.4 | 1.07 | 20 | 10.0 |
| 10 | 0.09 | 0.46 | * | * | * | * | * | * | * | * |
| 11 | 0.05 | 0.35 | * | * | * | * | * | * | * | * |

* = not measured

TABLE IIC

| Example Number | % WT. LOSS AFTER UV EXPOSURE | | | | | |
|---|---|---|---|---|---|---|
| | 300 kJ/m$^2$ | 600 kJ/m$^2$ | 900 kJ/m$^2$ | 1250 kJ/m$^2$ | 1500 kJ/m$^2$ | 2000 kJ/m$^2$ |
| C3 | 0.05 | 0.04 | 0.21 | 0.26 | 0.17 | 0.30 |
| 5 | −0.11 | −0.02 | −0.07 | −0.06 | −0.03 | −0.03 |
| 6 | −0.11 | −0.02 | −0.05 | −0.05 | −0.01 | 0.01 |
| C4 | −0.08 | 0.01 | 0.02 | 0.04 | 0.07 | 0.14 |
| 7 | −0.09 | 0.00 | −0.02 | −0.03 | 0.04 | 0.04 |
| 8 | −0.11 | −0.02 | −0.04 | −0.04 | −0.01 | 0.04 |
| 9 | −0.04 | −0.12 | −0.03 | 0.07 | −0.01 | 0.09 |
| 10 | * | 0.00 | 0.11 | 0.11 | * | 0.30 |
| 11 | * | −0.02 | 0.16 | 0.08 | * | 0.26 |

*not measured

I claim:

1. A composition consisting essentially of
   (a) 95.00–99.90 weight percent of a polyacetal polymer,
   (b) 0.05–2.50 weight percent of at least one hindered amine light stabilizer ("HALS") selected from the group consisting of HALS (b)(1) and HALS (b)(2) as follows:

HALS (b) (1)

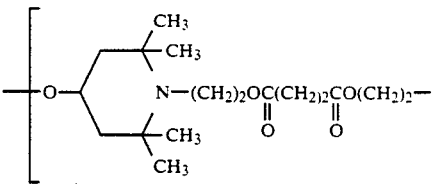

HALS (b)-(2)

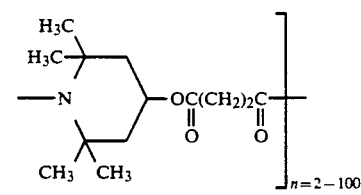

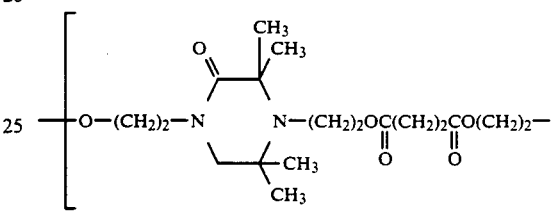

and
   (c) 0.05 to 2.50 weight percent of at least one HALS selected from the group consisting of HALS (c)(1), HALS (c)(2), and HALS (c)(3) as follows:

HALS (c) (1)

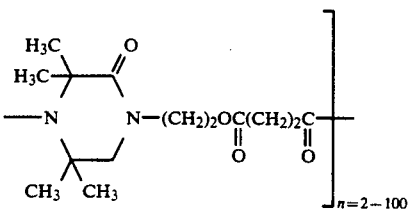

-continued

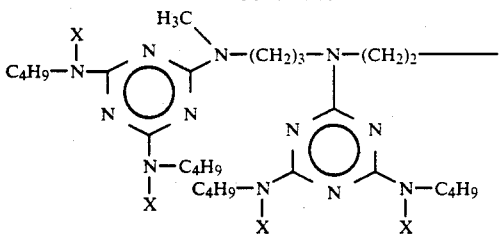

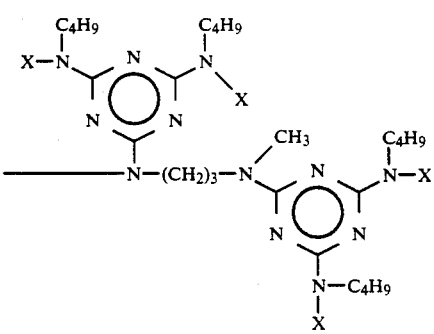

HALS (c) (2)

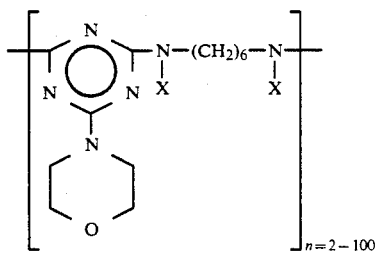

HALS (c) (3)

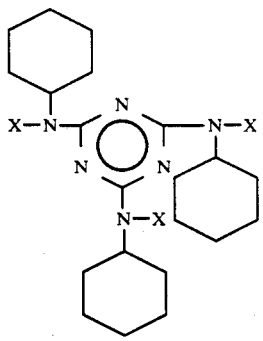

and where in each of HALS (c)(1), HALS (c)(2), and HALS (c)(3), X is selected from

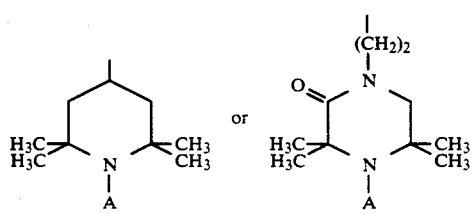

wherein A is $C_1$–$C_6$ alkyl, and provided that the above stated weight percents are based upon the total of components (a), (b), and (c) only.

2. The composition of claim 1 wherein the component (a) polyacetal is a polyacetal homopolymer.

3. The composition of claim 1 wherein the component (a) polyacetal is a copolymer.

4. The composition of claim 1 wherein the component (b) HALS is HALS (b)(1).

5. The composition of claim 1 wherein A of the component (c) HALS is a methyl group.

6. The composition of claim 1 wherein the component (c) HALS is (c)(1), X is

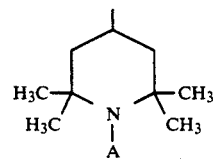

and n is 2–20.

7. The composition of claim 1 wherein the component (c) HALS is HALS (c)(2), X is

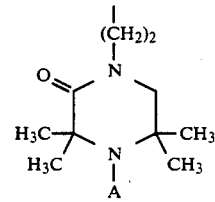

and n is 2–20.

8. The composition of claim 1 wherein the component (c) HALS is HALS (c)(3) and X is

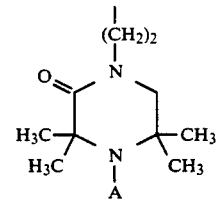

9. The composition of claim 1 further comprised of at least one of thermal stabilizers, antioxidants, pigments, colorants, toughening agents, reinforcing agents, UV absorbers, nucleating agents, lubricants, glass fibers, and fillers.

10. The composition of claim 1 further comprised of at least one thermal stabilizer selected from nitrogen-containing polymers, hydroxy-containing polymers, hydroxy-containing oligomers, microcrystalline cellulose, and mixtures thereof.

11. The composition of claim 1 further comprised of at least one hindered phenolic antioxidant.

12. The composition of claim 1 further comprised of at least one UV absorber selected from the group consisting of benzotriazoles, benzophenones, oxanilides, and cyanoacrylates.

13. Shaped articles made from the composition of claim 1.

14. Shaped articles made from the composition of claim 1 and used in an automotive application.

* * * * *